United States Patent [19]

Kreps

[11] Patent Number: 5,117,975
[45] Date of Patent: Jun. 2, 1992

[54] STACKING CONTAINER FOR AN UNCURED RADIAL TIRE

[75] Inventor: Norman D. Kreps, Jackson Township, Stark County, Ohio

[73] Assignee: The Uniroyal Goodrich Tire Company, Akron, Ohio

[21] Appl. No.: 581,179

[22] Filed: Sep. 6, 1990

Related U.S. Application Data

[63] Continuation of Ser. No. 430,404, Nov. 2, 1989, abandoned.

[51] Int. Cl.$^5$ .............................................. B65D 21/02
[52] U.S. Cl. ................................... 206/304; 206/509; 206/512; 425/38
[58] Field of Search ............... 206/304, 386, 599, 600, 206/509, 511, 512; 294/67.1, 68.1; 425/38, 49

[56] References Cited

U.S. PATENT DOCUMENTS

| Re. 27,060 | 1/1965 | Balle et al. ............................ 425/38 |
| 2,659,484 | 11/1953 | Averill ................................. 206/304 |
| 3,012,663 | 12/1961 | Thorne ................................. 206/304 |
| 3,080,964 | 5/1963 | Robinson et al. . |
| 3,654,875 | 4/1972 | Vik ....................................... 206/599 |
| 3,809,592 | 5/1974 | Dennis et al. ......................... 425/38 |
| 3,819,847 | 6/1974 | Charles . |
| 3,956,510 | 5/1976 | Beall . |
| 4,043,462 | 8/1977 | Schiron ................................. 206/304 |
| 4,252,241 | 2/1981 | Trail ...................................... 425/38 |
| 4,257,523 | 3/1981 | Blasio ................................. 294/67.1 |
| 4,472,125 | 9/1984 | Kubo et al. ............................ 294/93 |
| 4,637,644 | 1/1987 | Trethowan .......................... 425/38 |
| 4,664,260 | 5/1987 | Stokes ................................. 206/386 |
| 4,732,528 | 3/1988 | Good .................................... 206/600 |
| 4,827,643 | 5/1989 | Hearst et al. ......................... 206/509 |

FOREIGN PATENT DOCUMENTS

| 1484087 | 6/1967 | France ................................. 425/38 |
| 1109015 | 4/1968 | United Kingdom ................. 206/512 |

Primary Examiner—Stephen Marcus
Assistant Examiner—S. Castellano
Attorney, Agent, or Firm—Greg Strugalski; Alan A. Csontos

[57] ABSTRACT

A container for an uncured radial tire assembly having a tread portion and a sidewall joined at a shoulder and having a bead portion located axially outwardly of the sidewall. The container comprises a base and a frustoconical surface attached to the base. The frustoconical surface is for engaging the shoulder of the tire assembly to support the tire assembly with the bead portion and sidewall extending axially from the tire assembly substantially without deforming. The frustoconical surface is capable of supporting more than one size tire assembly. Two containers are stackable so a tire assembly is supported in one of the containers without being contacted by the other container.

8 Claims, 2 Drawing Sheets

STACKING CONTAINER FOR AN UNCURED RADIAL TIRE

This is a continuation of copending application(s) Ser. No. 07/430,404 filed on Nov. 2, 1989 now abandoned.

BACKGROUND OF THE INVENTION

1. Field of the Invention

The present invention relates to handling an uncured radial tire in a factory between a tire building machine and a tire curing press. Particularly, the present invention relates to a container for the uncured radial tire.

2. Description of the Prior Art

An uncured radial tire is assembled from a plurality of components on a tire building machine. The components of the uncured radial tire include a generally air impermeable liner and a load carrying carcass. The carcass extends between a pair of circumferentially inextensible beads which are spaced apart axially. Belts are centrally located on the carcass between the beads and under a tread portion. A pair of sidewalls extend from axially opposite ends of the tread portion to a respective bead. The components are made, at least partially, from an uncured elastomeric material. The components are maintained in positions relative to one another by the tackiness of the uncured elastomeric material.

When the uncured radial tire assembly is removed from the tire building machine, the assembly has a generally barrel shape with the beads extending as the axially outermost portions of the assembly. The tread and belt region of the uncured radial tire assembly is relatively stiff and rigid. In order to minimize damage to the uncured radial tire assembly between the tire building machine and a curing press, it is desirable to maintain the assembly in the barrel-shaped state and substantially free from any deformation.

It is known in the tire industry that damage may result to the uncured radial tire assembly during handling or transporting the uncured radial tire between the tire building machine and the tire curing press. Such damage typically occurs because of rough handling, impact with equipment in the factory or with other tires all of which cause deformation of the uncured radial tire assembly. Deformation of the uncured radial tire assembly may cause the components to move relative to one another from their assembled relative positions. The relative movement of the components is usually undetected until after the tire is cured and tested, which can result in costly waste and scrap.

Known systems for handling an uncured radial tire within a factory include a truck-like vehicle having horizontally extending posts on which the uncured radial tires are hung from their beads. Conveyor systems are also known and include movable hooks on which the uncured radial tires are hung from their beads. Hanging an uncured radial tire from its beads may result in damage due to deformation because the weight of the tire is supported by a relatively small area. This is especially true if the tire is left hanging for a relatively long period of time.

To eliminate hanging an uncured radial tire from its beads, truck-like vehicles have been developed and include a series of horizontally extending plates with openings. An uncured radial tire is placed on the plate adjacent an opening so an annular portion of the sidewall of the tire is supported. One of the beads extends through the opening in the plate. The bead of the uncured radial tire extending through the opening is not deformed. However, the sidewall of the tire is deformed from the natural barrel shape which may cause relative movement of other components in the uncured radial tire assembly.

Containers for handling annular objects are also known. For example, U.S. Pat. No. 3,080,964 discloses a container for shipping an annular object, such as a finished ball bearing assembly. U.S. Pat. No. 3,080,964 discloses a container having stepped portions which allow the container to support more than one size (inner and outer diameter) of finished bearing assembly. However, the bearings are supported at an axially outermost surface and are not made from a deformable elastomeric material.

SUMMARY OF THE INVENTION

The present invention is directed to a container for an uncured radial tire assembly having a generally barrel shape. The uncured radial tire assembly has a tread and a sidewall joined together at a shoulder. The uncured radial tire assembly also has a bead portion extending axially outwardly of the sidewall. The container permits the handling or transporting of the uncured radial tire assembly so the sidewalls and beads remain in a substantially deformation-free barrel-shaped condition.

The container comprises a base and a frustoconical surface attached to the base for engaging the shoulder of the uncured radial tire assembly to support the assembly. An opening is located adjacent the frustoconical surface to permit the bead portion of the uncured radial tire assembly to extend into. The sidewall and the bead portion preferably do not engage any portion of the container when the shoulder engages the frustoconical surface. The frustoconical surface is capable of supporting more than one outer diameter size uncured radial tire assembly. By supporting the uncured radial tire assembly from only the relatively rigid shoulder, the uncured radial tire assembly remains in a substantially deformation-free barrel-shaped condition. This is a natural condition of the uncured radial tire assembly and is desirable to prevent damage to the assembly by relative movement of the components comprising the assembly.

The container further includes means that enable stable stacking of two containers. The means that enable stable stacking comprises a plurality of standoffs extending from the base of a container. The standoffs extend for a distance greater than the axially extent of the uncured radial tire assembly in a direction axially opposite of the opening. The means that enable stable stacking further includes recesses located in the base on a side opposite the standoffs. Each recess is for receiving a respective standoff from another container. Preferably, the frustoconical surface, the base and standoffs are integrally molded as one piece from a homogeneous plastic material. The plastic material is not readily adhered to by contact with the uncured radial tire assembly.

The container also includes means for uniquely identifying the container comprising a label located on a side of the base. A machine readable code is located on the label. The container also includes means in the base for receiving a suitable tool from an external mechanism enabling the container to be gripped and/or moved. Thus, the container is readily adaptable to automated handling devices.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
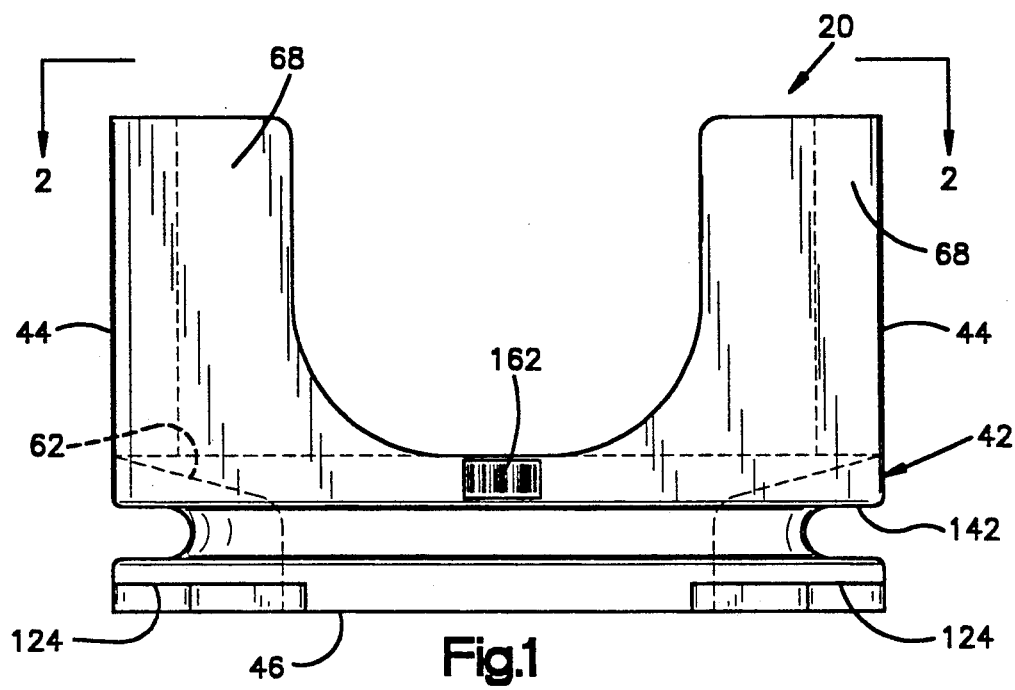
FIG. 1 is an elevational view of a container embodying the present invention for an uncured radial tire assembly.
Figure 2:
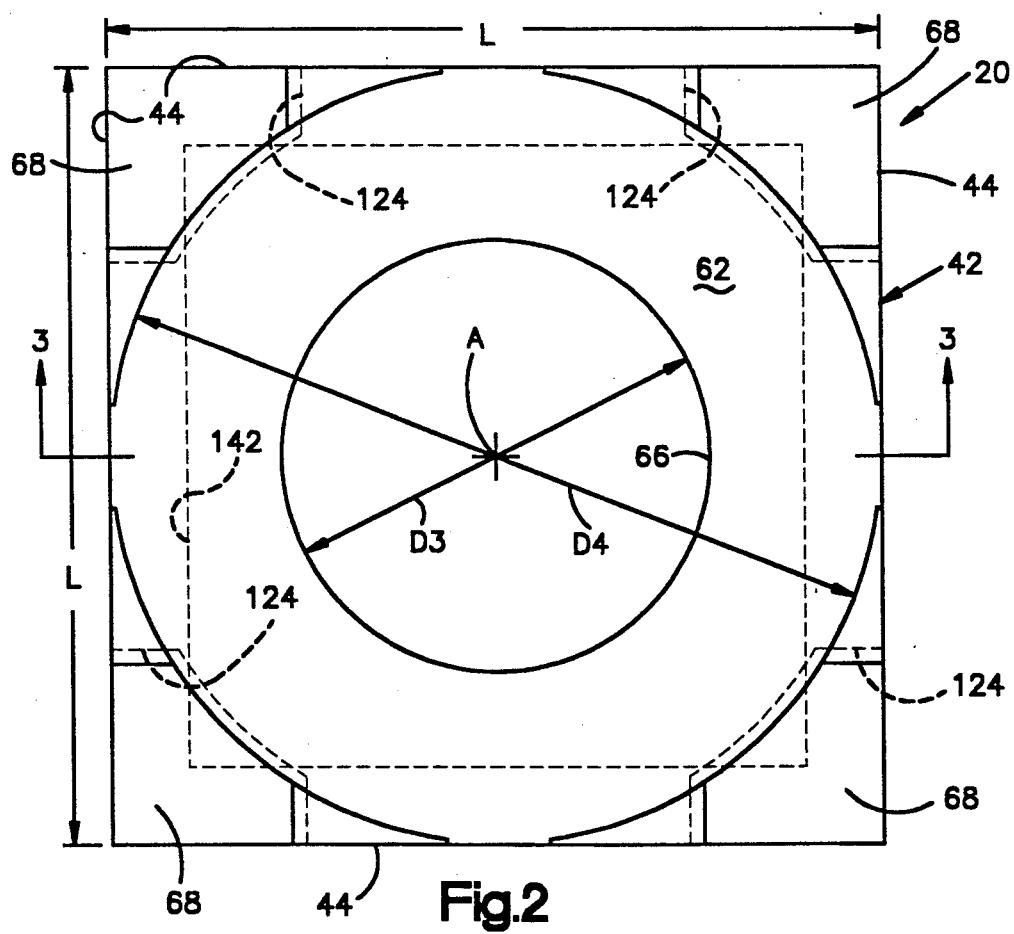
FIG. 2 is a plan view of the container in FIG. 1, taken along line 2—2 in FIG. 1.
Figure 3:
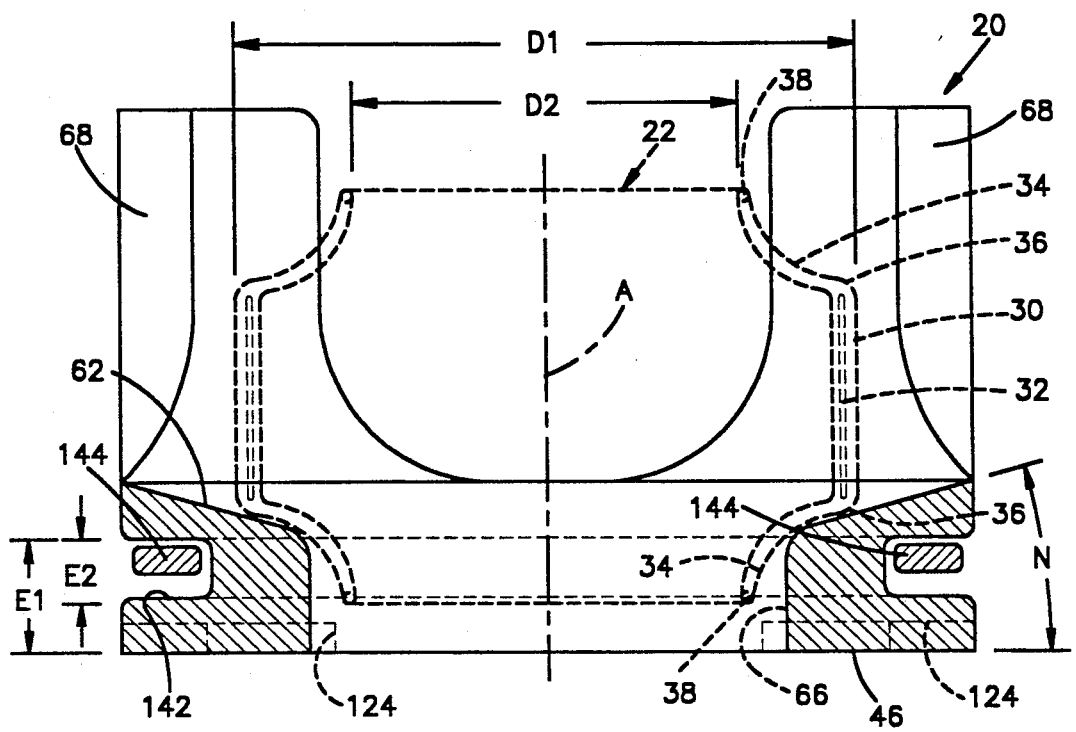
FIG. 3 is a cross-sectional view of the container in FIG. 2, taken approximately along line 3—3 in FIG. 2, and is illustrated supporting the uncured radial tire assembly.

A container 20 is illustrated in FIGS. 1 and 2 for supporting an uncured radial tire assembly 22 (shown in phantom lines in FIG. 3). The uncured radial tire assembly 22 has a generally barrel-shape after being removed from a tire building machine, as is known. The uncured radial tire assembly 22 is then transported to a curing press, where it is molded into a final toroidal shape.

The uncured radial tire assembly 22 typically includes a tread portion 30 (FIG. 3). An annular belt layer 32, having reinforcing members, such as parallel extending steel wires, is located radially inwardly of the tread portion 30 to form a relatively stiff and rigid region of the tire. A pair of sidewalls 34 extend from axially opposite ends of the tread portion 30. Each sidewall 34 joins the tread portion 30 at a shoulder 36. For purposes of the present invention, the shoulder 36 is considered a part of the sidewall 34. A bead 38 is attached to a respective one of the sidewalls 34 and is the axially outermost portion of the uncured radial tire assembly 22 in a respective direction. The uncured radial tire assembly 22 has a size established by an outer diameter D1 of the tread portion 30 and by an inner diameter D2 of the beads 38.

The uncured radial tire assembly 22 is susceptible to damage during handling and/or transportation between the tire building machine and the curing press. The uncured radial tire assembly 22 is supported in the container 20 in such a manner that the uncured radial tire assembly retains its generally barrel-shape configuration. Thus, the risk of damage due to deformation of the uncured radial tire assembly 22 is minimized.

The container 20 (FIG. 1) includes a base 42 having four sides 44 and a bottom surface 46 for supporting the container on a surface such as a table, conveyor belt or floor. The base 42 has a generally square configuration, as viewed in FIG. 2. The container 20 is sized sufficiently large so that no portion of the uncured radial tire assembly 22 extends beyond the boundaries of the container. For example, the length L of any one side 44 of the container 20 is larger than the outer diameter D1 of the largest uncured radial tire assembly 22 that is to be placed in the container. This assures that chances of damage to the uncured radial tire assembly 22 by contact with external objects is minimized.

A frustoconical surface 62 (best seen in FIG. 3) is attached to the base 42 for supporting the uncured radial tire assembly 22. A circular opening 66 extends from the frustoconical surface 62 to the bottom surface 46 of the container 20. The opening 66 is located coaxially with the frustoconical surface 62.

The lower bead portion 38 of the uncured radial tire assembly 22, as viewed in FIG. 3, extends into the opening 66 in the base 42. The opening 66 has a diameter D3 (FIG. 2) which also establishes the inner limit of the frustoconical surface 62. The diameter D3 is greater than the inner diameter D2 of the uncured radial tire assembly 22. The frustoconical surface 62 has an outer diameter D4. The outer diameter D4 is larger than the outer diameter D1 of the uncured radial tire assembly 22.

Preferably, the diameter D3 is selected to be smaller than the outer diameter D1 of the smallest uncured radial tire assembly 22 that is typically handled in the factory. The diameter D4 is preferably selected to be larger than the outer diameter D1 of the largest tire typically handled in the factory. Thus, the frustoconical surface 62 enables the handling and transportation of more than just one size of uncured radial tire assembly 22 by the container 20.

The axial extent E1 (FIG. 3) of the opening 66 in a direction parallel to the longitudinal central axis A of the container 20 is greater than the axial extent E2 of the lower bead portion 38 of the uncured radial tire assembly 22 from the lower end of the frustoconical surface 62, as viewed in FIG. 3. Thus, the lower bead portion 38 is protected from contact by an external object from below the container 20. The opening 66 is shown open in the preferred embodiment because the container 20 is formed from a homogeneous plastic material as an integral one piece molding. Thus, it will be apparent that the opening 66 is merely for ease of manufacture. The plastic material is selected so the uncured radial tire 22 does not readily attach to the container 20 due to its tackiness. However, it will be apparent that the bottom of the opening 66 may be closed. For example, a plate member could be attached or the container 20 be formed in such a manner to close the opening 66.

The frustoconical surface 62 is oriented at an angle N (FIG. 3) relative to the bottom surface 46. Thus, the uncured radial tire assembly 22 preferably contacts only an annular area of the frustoconical surface 62 at the lower shoulder 36, as viewed in FIG. 3. The frustoconical surface 62 is disposed at an angle N of between 5° to 60° and, preferably, between 10° and 25°. Preferably, the lower bead portion 38 and lower sidewall 34 do not contact any part of the surface defining the opening 66 or the frustoconical surface 62. Thus, the lower bead portion 38 and lower sidewall 34 extend in substantially deformation-free or natural condition and the uncured radial tire assembly 22 remains barrel-shaped.

Figure 4:
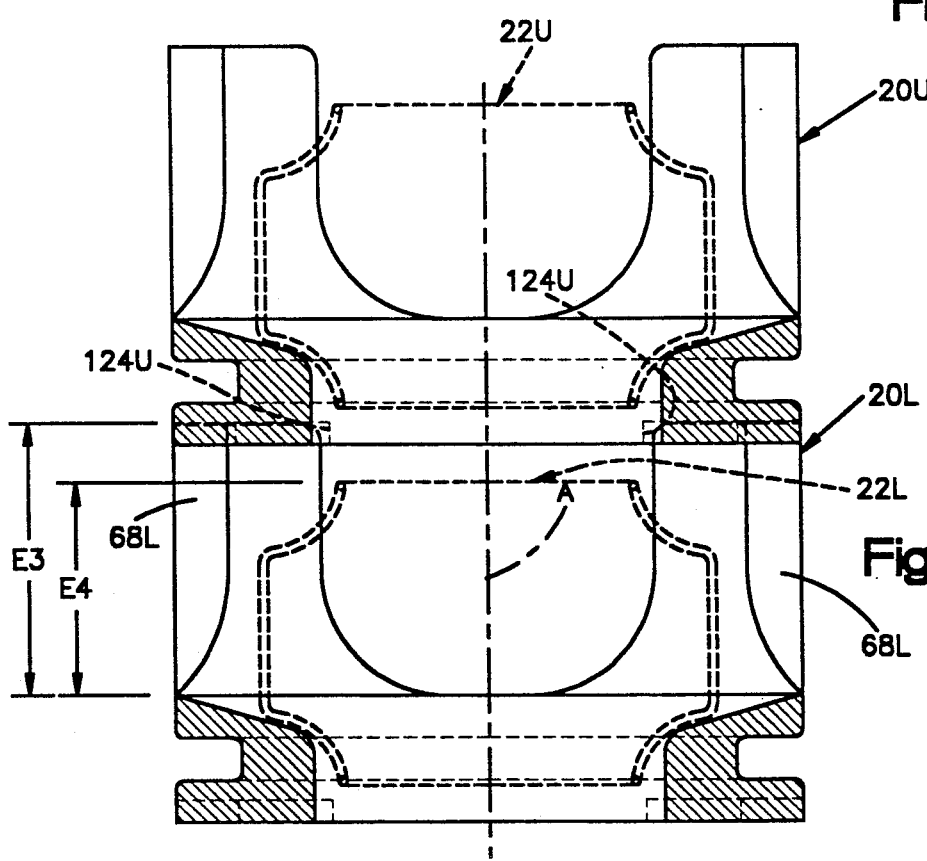
FIG. 4 is a cross-sectional view of two containers of the present invention stacked.

Two or more containers 20 may be stacked in a stable manner, as illustrated in FIG. 4. The stacking feature of the container 20 embodying the present invention provides efficient storage or transportation of uncured radial tire assemblies 22 and protects the uncured radial tire assemblies from damage due to contact with external objects or due to deformation.

Four parallel extending standoffs 68 (FIGS. 1 and 2) are attached to the base 42. Each standoff 68 is located at a respective corner of the base 42. The standoffs 68L extending axially from the lower container 20L, as viewed in FIG. 4, cooperate with recesses 124U on the upper container 20U to enable the stable stacking of the containers. The axial extent E3 (FIG. 4) of each of the standoffs 68L is greater than the axial extent E4 of the lower uncured radial tire 22L in a direction away from the frustoconical surface 62. The axial extent E3 of the standoffs 68L prevents the upper container 20U from contacting any portion of the lower uncured radial tire assembly 22L which could cause undesired deformation of the tire assembly.

A respective recess 124 (FIG. 3) is located at each of the four corners of the base 42 axially opposite of a respective standoff 68. The term "axially" is used to describe the direction parallel to the longitudinal central axis A of the container 20. Each of the recesses 124 is shaped slightly larger than a standoff 68. Each of the recesses 124U (FIG. 4) receives an end portion of one of the respective standoffs 68L. The L-shape of each standoff 68 and recess 124, as viewed in FIG. 2, enables stable stacking by preventing rotation of one container 20 about the axis A relative to another container. The cooperation between the standoffs 68 and recesses 124 also prevents transverse relative movement between two containers 20 in a direction transverse to the axis A.

The container 20 further includes a groove 142 (FIG. 3) extending the entire length L of each side 44 of the base 42. The groove 142 receives a suitable tool or gripping device 144 from some external handling or transport mechanism. The tool 144 can manipulate the container 20 for loading or unloading of the uncured radial tire assembly 22, or for the stacking of one container 20U on another container 20L, or transporting the container if the tool is a prong of a forklift. The groove 142, thus, enables the container 20 to be readily adapted to automated handling.

Another feature of the container 20 of the present invention includes a label 162 (only one shown, FIG. 1) located centrally on each side 44 of the base 42. Each label 162 has a machine readable code, such as a UPC bar code that can be laser scanned. The label 162 and bar code identify each individual container 20 with a unique code. Thus, an uncured radial tire assembly 22 located in the container 20 is associated with a unique code.

Preferably, a label 162 on a container 20 is scanned immediately after the tire is placed in the container at the tire building machine. Scanning the label 162 identifies the container 20 and associated uncured radial tire assembly 22 to a master database. The uncured radial tire assembly 22 is associated with that particular container 20 until the assembly is removed from the container at the curing press. Information such as the size of tire, type of tire, tire building machine or operator that built the tire may be incorporated into the master database. This information can be used for tracking a specific uncured radial tire assembly 22 between the tire building machine and curing press, or any other intermediate operations. The label 162 may also be used for identifying the uncured radial tire assembly 22 during storage, transportation or sorting.

From the above description of the preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. A container for an uncured radial tire assembly having a sidewall and a bead portion located axially outwardly of the sidewall, said container comprising:
   a base;
   surface means attached to said base for engaging a portion of the sidewall of the tire assembly to support the tire assembly with the bead portion of the tire assembly extending axially outwardly of the sidewall of the tire assembly without contacting said base and said surface means; and
   means on said base enabling the stacking of two containers so a tire assembly is supported in one of the containers without being contacted by the other container.

2. The container set forth in claim 1 wherein said surface means comprises a frustoconical surface for supporting more than one size tire assembly at the shoulder of the tire assembly.

3. The container set forth in claim 1 further including means on said base for identifying the container.

4. The container set forth in claim 3 wherein said identifying means comprises a label having a machine readable code.

5. The container set forth in claim 1 wherein said means on said base enabling the stacking of two containers comprises a plurality of standoffs extending from said base and a plurality of recesses located in said base on a side of said base axially opposite said standoffs, each of said plurality of recesses for receiving a respective standoff from another container.

6. The container set forth in claim 5 wherein said base, said surface means and said standoffs are integrally molded as one piece from a homogeneous plastic material.

7. The container set forth in claim 1 further including means enabling the manipulation of said base.

8. The container set forth in claim 7 wherein said means enabling the manipulation of said base comprises at least one groove in said base for receiving a suitable tool from an external mechanism.

* * * * *